UNITED STATES PATENT OFFICE.

CHARLES MAYR, OF SPRINGFIELD, MASSACHUSETTS.

FIRE-EXTINGUISHING COMPOSITION.

SPECIFICATION forming part of Letters Patent No. 410,326, dated September 3, 1889.

Application filed September 28, 1887. Serial No. 251,260. (No specimens.)

*To all whom it may concern:*

Be it known that I, CHARLES MAYR, of Springfield, in the county of Hampden and State of Massachusetts, have invented certain new and useful Improvements in Fire-Extinguishers, of which the following is a full, clear, and exact description, whereby any one skilled in the art can make and use the same.

My improvement relates to the class of fire-extinguishers in which a vessel is used to hold a quantity of water and chemicals, so arranged that they may be mixed when required for use, and by their mixture generate a gas, the pressure of which furnishes the motive power of expelling the mixture of water and fire-extinguishing ingredients forcibly out of the containing-vessel.

The object of my invention is to provide for use in such a vessel a number of mixtures that when united will produce nitrogen gas, compounds of nitrogen and oxygen in such quantities as to cause it to serve as the medium for forcing the fluid contents out of the vessel with which the gas is mixed to a greater or less degree; and to this end my invention consists in a suitable fluid-containing vessel having an outlet in combination with a charge of chemicals to produce nitrogen gas; and it further consists in the combination of such a vessel with the mixture, substantially as hereinafter described, for producing nitrogen gas, and having mixed therewith an ingredient to decompose the nitrous anhydride set free into free nitrogen, nitric oxide, and water, all as more particularly hereinafter described, and pointed out in the claim.

A vessel in which my improved fire-extinguishing mixture may be stored and used is clearly shown and described in United States patent to Leroy S. Lewis, dated July 20, 1886, No. 345,908, and using such a vessel I have found a charge for a small one to be sufficient when made as follows: To one gallon of water I add six ounces of nitrite of soda and three ounces of an organic amide, like cyanamide, acetamide, the latter ingredient serving to decompose the nitrous acid into nitrogen set free and an organic acid. The nitrous acid or nitrous anhydride is set free by the union of the above ingredients with three fluid ounces of sulphuric acid, the latter being held for storage in a suitable bottle, of glass or lead, until the time when the extinguisher is required for use, and then suddenly being mixed with the other ingredients by breaking or overturning the bottle containing the acids. In order to prevent the mixture, as above, from freezing while being stored for use, I mix it with one ounce of sulphate of ammonia or a proportionate amount of an equivalent other chemical.

It has been proved by experiment that the above-described mixture will generate nitrogen gas that will maintain a more uniform pressure from the time when its generation has begun until the contents of the vessel have all been expelled by the pressure of the gas. This nitrogen gas does not saturate the water nor intimately mix with it as is the case with carbonic-acid gas; but it is sufficiently mixed to be thrown out in portions that appear as bubbles as the stream pours from the outlet-tube, and it forms a much more effective agent for the extinguishment of fires than does carbonic-acid gas.

Although I prefer to use sulphuric acid in the proportions above described, any other acid of the same proportional strength can be used without departing from my invention.

I claim as my invention—

A charge for a fire-extinguisher, consisting of a mixture of the following ingredients: water, sulphuric acid, nitrite of soda, and an organic amide, like acetamide, in the proportions substantially as herein specified.

CHARLES MAYR.

Witnesses:
CHAS. L. BURDETT,
LEROY S. LEWIS.